Patented Feb. 5, 1952

2,584,919

UNITED STATES PATENT OFFICE 2,584,919

PULVERENT ASPHALTIC COMPOSITION

Harold B. Pullar, Magnolia, Ark., assignor to Berry Asphalt Company, Magnolia, Ark., a corporation of Illinois No Drawing. Application June 28, 1949,
Serial No. 101,925

3 Claims. (Cl. 106—281)

This invention relates to asphaltic compositions of novel character suitable for use as crack and joint fillers, bonding compositions, patching cements, insulation, waterproofing, roofing, treatment and construction of roads and other surfaces, and the like.

One object of the present invention is to provide a stable powdered asphalt composition which may be packaged and stored in dry condition for considerable periods, and which may thereafter be quickly and conveniently mixed with, and dissolved or dispersed in suitable solvents or fluxes, either hot or cold, and with or without added fillers or aggregates, for the uses indicated.

Another object of the present invention relates to the character and composition of the aforesaid powdered asphalt composition, and more particularly to the novel character, utility and advantages of a specific filler, namely barium sulfate or barite, which I incorporate in pulverulent condition with powdered asphalt to provide my dry storage stable basic mixture.

Another object of my invention relates to the provision of wetting agents in the dry asphaltic composition mixture, and which while of latent character therein, serve to permit better bonding of the asphaltic material, after addition of solvents or fluxes to applied surfaces, and serve to prevent stripping of the asphaltic material from the applied surfaces by moisture.

Another specific object of my invention relates to the mixture of the aforesaid powdered asphalt-barium sulfate composition with an asphalt flux oil to make a finished product of desired melting point and penetration, eminently suitable for use as a crack and joint filler for use on roads, pavements, airports, building structures and other places where an expansion joint is required or where cracks have developed which require repair. Hot asphalt and various types of cold joint fillers have been used for many years, but because of the difficulties and high cost of application or their ineffectiveness in adhering to moist or wet joint edges or surfaces, such hot asphalt and cold joint fillers have made previous joints unsatisfactory.

Another object of the present invention relates to the employment of my barium sulfate-powdered asphalt mixture blended with petroleum fluxes as a heat-liquefied asphaltic cement binder for asphaltic road composition of the sheet-asphalt or asphaltic-concrete type. The composition may also be utilized in cold application-type road surfaces using solvents or emulsification for liquefaction.

Another object of my invention relates to the employment of my barium sulfate-powdered asphalt composition blended with a petroleum flux as a saturant and coating in the manufacture of rolled roofing and shingles.

Other objects relates to various other compositions employing my base powdered asphalt-barium sulfate composition, as will hereinafter more fully appear.

In preparing my base powdered asphalt-barium sulfate mix, I employ a finely-powdered hard asphalt, such as, for example, one where substantially all will pass a 40 mesh sieve, and a considerable portion passes even a 200 mesh sieve. The softening point of such asphalt may be from about 200° F. to about 300° F. (ring and ball method), and of such penetration (A. S. T. M.-needle) or hardness to lend itself to pulverization under ordinary conditions, namely less than about 5 at 77° F.

One particular type of asphalt which I have found to be satisfactory is derived from the propane precipitation of crude oil tank bottoms, having a softening point of approximately 210° F., a penetration at 77° F., using 100 grams for five seconds of 0 to 1, a specific gravity of about 1.035 to about 1.045 Saybolt furol viscosity at 325° F. of approximately one hundred and twenty seconds, and completely soluble in benzene or carbon bisulfide. Another satisfactory asphalt is one of 250-275° F. softening point and of 0 to 1 penetration at 77° F. produced by oxidation of a vacuum distilled asphaltic residuum. Other suitable asphalts may be derived from various crudes, using solvents other than propane, as now generally practiced in solvent separation of lubricating oil stocks. I prefer to employ the solvent-extracted types of asphalt since they have rather sharp softening point characteristics, that is, change from solid to liquid phase in a narrow range of temperature, and they amalgamate more readily with the solvents or heated flux oils in the preparation of my final composition.

The filler which I employ, namely barium sulfate or barite, may be employed in the nearly chemically-pure form or in the commercial form known as "barytes," containing approximately 92% or more barium sulfate and concomitant natural impurities. I employ the barium sulfate in finely-divided pulverulent form, such that all pass a 200 mesh sieve and substantially all passes a 325 mesh sieve.

As an example of a commercial source material, I may employ the pulverized barytes separated from ores with which it is associated. In the separation process, particle size can be readily controlled so that I may use material of any desirable particle size or range of sizes. In the preparation and separation of this powdered barium sulfate from the ores with which it may be associated, as a part of the refining operation, flotation processes are commonly used in which filming agents, wetting agents, surface-tension reducing agents, and the like surface-active agents, such as long chain amines, long chain fatty amines, fatty or resin acids, and others producing similar physical phenomena are employed. In the final drying of the barium sulfate, these aforementioned wetting agents remain and, thus, I may advantageously employ such commercially-prepared barium sulfate in my hereinafter described process, particularly when they are of the character of anti-stripping or adhesion promoting agents for asphaltic or other bituminous materials under exposure to moisture without necessity for directly adding such agents to the composition.

In the alternative, when employing barium sulfate prepared in other manners or in chemically-pure condition, I may add to the composition any of the known anti-stripping agents or compositions, examples of which are those described in Dhose et al. U. S. Patent No. 2,191,295; Fischer U. S. Patent No. 2,461,971; and others.

Thus, an example of barytes material which I have found to be satisfactory is the material of particle size of about 5 to about 50 microns, such as that conventionally employed in the preparation of drilling muds. I have also found that I can very satisfactorily use the barytes of smaller than about 5 micron diameter, which product is now wasted as an effluent in the centrifugal separation process because its fineness renders it unsuitable for use in oil well drilling muds. This fineness makes it desirable in my composition because it has a greater tendency to remain in suspension and in admixture with asphalts and flux oils when formulated with solvents, or liquefied with heat. Barytes, as is known, has a specific gravity or density of about four times that of ordinary asphalts.

These two components are dry mixed in the proportions, by weight, or from 25% to 75% pulverulent barium sulfate to 75% to 25% powdered asphalt, a typical mixture being one containing equal parts by weight of the asphalt to the barium sulfate. The wetting agent may be suitably preincorporated with the barium sulfate or added to the mix in the proportion of about 0.1% to about 1% by weight of the bitumen, or in any other suitable manner.

The advantages of barium sulfate in my preliminary and ultimate composition are several. Thus, for example, it coats the asphalt particles and serves to hold them spaced and to prevent their amalgamation in the dry mix, giving long storage stability. Further, its presence in this manner permits quick access to the asphalt particles of oil or solvent when added thereto in use or formulation, so that for example when a hot flux oil is added and mixed therewith, a good smooth amalgamation can be obtained in about five to ten minutes. As distinguished from this, the prior art methods of mixing powdered asphalt with flux oil required from one to ten hours because the powdered asphalt immediately became lumpy on contact with the hot oil. More particularly, if the filler, such as the barium sulfate were added last, instead of being in my pre-mix, it would ball up and could not be dispersed. Further, barium sulfate, being a good conductor of heat, aids in rapid uniform amalgamation of the powdered asphalt with added hot asphaltic flux oil.

A further advantage of the barium sulfate is its high specific gravity, being about four times that of asphalt. Thus, when employed in crack filling mix, it rapidly and effectively penetrates the opening to which it is applied, due to its weight and becomes securely anchored.

Even though the barium sulfate is of a relatively high density, due to its employment in the indicated pulverulent form, it remains in intimate distribution with and over the powdered asphalt in the pre-mix, and remains in uniform distribution and suspension in the final formulated mixture. The barium sulfate otherwise is chemically inert with respect to the asphalt and functions in a purely physical manner in the mixture.

The incorporation of wetting agent serves to displace water from areas to which the final composition is applied, and aids in bonding the asphaltic material to the place where it is applied and serves to prevent stripping thereof by moisture.

The usual fillers when incorporated into asphalts to form plastic compositions of the character referred to previously, greatly increase the softening point or flow characteristics and increase the hardness of the composition. This is particularly true in the preparation of roof coating asphalts where filler contents as high as 40% to 60% may be used. As an example, 60% of slate flour of a type commercially used in roofing manufacture increases the ring and ball softening point more than 100° F., while an equivalent amount of barytes of 5 to 50 micron diameter particles increased the softening point only 20° F. Similar results to the slate flour were obtained with the use of other powders such as limestone, Portland cement, gypsum, etc., as distinguished from the unexpected phenomena which result from the use of this barium sulfate as described. Similar phenomena also exist in the manner in which my barium sulfate compositions actually displaced moisture or water when poured into cracks or expansion joints in cement-concrete structures such as roads or bridgeways. Moreover, the adhesion and bond continues to be perfect over a period of time whereas compositions of this character compounded with the fillers other than barium sulfate did not adhere to the structures.

The following examples are given for the purpose of illustrating my invention, including the basic mixture of powdered asphalt and pulverulent barium sulfate and various formulations thereof, although it will be understood that, as previously pointed out, an essential feature of my invention is the initial preparation of the powdered asphalt-barium sulfate mix before adding solvents, flux oils and the like thereto, the basic mix being characterized by long storage stability without agglomeration or coalescence of the asphalt so that it may be stored for extended periods of time, packed in bags or containers and the like prior to use.

*Example 1*

A basic composition was prepared by intimately admixing equal parts by weight of pulverulent barium sulfate obtained by the flotation and centrifugal separation process previously described and wherein surface-active agents had been used having the property of asphalt-anti-stripping agents, and propane precipitated powdered asphalts of the character and fineness previously indicated. This was packed and sealed in small containers and, after a year, it still remained in fine pulverulent condition without exhibiting coalescence of the asphaltic particles.

*Example 2*

A similar dry mix was prepared composed of 1 part by weight of powdered asphalt of 250° F. melting point produced by distillation of a cracked residuum, substantially all passing a 40 mesh sieve and 25-35% passing a 200 mesh sieve, and 1 part by weight of barium sulfate which was prepared by precipitation from one of the soluble barium salts of pure composition. The character of the precipitated barium sulfate was such that substantially all passed a 325 mesh sieve. This composition was storage-stable, similar to the composition of the previous example.

*Example 3*

A dry mix was prepared composed of equal parts by weight of 210° F. propane precipitated powdered asphalt, substantially all passing a 40 mesh sieve, and finely-divided pulverulent barytes, substantially all passing a 325 mesh sieve. To this was added $\frac{1}{10}$% by weight of an amine and $\frac{1}{10}$% by weight of fatty acid, based on the asphalt, of the character described in Fischer Patent 2,461,971, for the purpose of providing anti-stripping properties to the asphaltic material when applied to an aggregate surface of an acidic or basic character.

Compositions of the foregoing character may be employed for various purposes, some examples of which are as follow:

*Example 4*

For household and miscellaneous uses, a dry powdered asphalt-barium sulfate mix of the preceding examples may be admixed with cold solvents, such as kerosene, gasoline, naphtha, turpentine, or with a non-flammable solvent, such as carbon tetrachloride. Thus, a satisfactory waterproofing plastic and adhesive may be prepared by adding ½ pint of solvent of the foregoing character to 1 pound of the dry mixture, and upon stirring the asphalt readily dissolves in the solvent and the composition may be conveniently applied with a brush to the desired surface. For the purpose of using the composition as a waterproofing paint and primer, the same procedure may be followed, employing a slightly larger amount of solvent.

*Example 5*

A patching cement was prepared by employing equal parts by weight of the dry powdered asphalt-barium sulfate mix, 1 part by weight of dry sand and 1 pint solvent per pound of powdered asphalt-barium sulfate mix. This composition is particularly adaptable for use with brick, cement, concrete and the like surfaces, particularly when containing or prepared with anti-stripping agents of the character previously indicated.

*Example 6*

A suitable caulking compound may be prepared by mixing 1 pound of the compositions of Examples 1 to 3, together with ½ pint of a solvent, such as kerosene, and about 1 tablespoon of an oil, such as lubricating oil. This compound is highly effective for caulking boats, door frames, foundations to framework joints, window frames and the like.

*Example 7*

A hard surface treatment was prepared by mixing 1 pound of the composition of the dry mix in Example 1, 1 pound of dry sand, 3 pounds of gravel and ⅔ pint solvent. This composition was found highly suitable for filling holes in asphalt surfaces and concrete surfaces, for errosion control of walls, filling of fence posts and a multitude of other similar uses.

*Example 8*

A dust layer may be prepared by mixing 5 gallons of crack-case drainings, thinned with a little kerosene if necessary, and 1 pound of the dry mix of Examples 1 to 3. This was found eminently suitable for controlling or preventing dust from being thrown up by traffic on gravel or dust roads by spreading it out thinly thereover.

*Example 9*

My composition is eminently suitable for use in the preparation of insulating compounds and may be prepared by mixing 1 pound of the composition of the dry mix in Example 1, 1 pound of dry sawdust, asbestos, ground cork and the like, together with ⅔ pint solvent.

In the foregoing examples, the solvents may be generally employed in the cold and have no softening effect on the final composition. Where it is desired to increase the softness of the final composition, light or heavy petroleum residues, such as fluxing oils of fluid consistency, may be added, either to the solvent or the barium sulfate-powdered asphalt mixture. These oils may be added in a heated state. For example, one typical formula for preparing a product very satisfactorily, adapted for filling cracks or joints in asphalt or concrete pavements, may be made as follows:

*Example 10*

25 parts powdered barium sulfate and 25 parts powdered hard asphalt were thoroughly mixed. The mix was added to 50 parts of a residual petroleum oil of approximately 200 seconds Saybolt furol viscosity at 210° F., heated to 300° F., and the whole intimately mixed until homogeneous. This, while in a heated condition, is then poured into the joints or cracks and allowed to cool.

*Example 11*

Another compound suitable for the same purpose may be prepared by adding the mixture of Example 1 to an oil of 400 seconds furol viscosity at 140° F. previously heated to 400° F. The composition is then mixed for about ten minutes and the temperature permitted to drop to 300° F. at which time it may be used for pouring into cracks and fillings. This finished product has a penetration at 77° F. of about 80 and a softening point of about 168° F. It is a very satisfactory material for expansion joints.

*Example 12*

A roof coating asphalt for making rolled roofing or shingles applied to the usual type of saturated felt may be made by using 70% of equal parts of the composition described in Example 1, combined with 30% of a flux oil of approximately 600 seconds viscosity at 180° F. in a heat-liquefied condition. This roofing composition has a softening point of about 210° F. The product was then used to manufacture mineral-surfaced shingles on a commercial roofing machine. When exposed to the sun on a roof for a period of a year, it showed no signs of slipping or sliding but was still soft enough to lie flat on the roof without any curling whatsoever.

I claim as my invention:

1. A pulverulent storage-stable asphaltic composition composed essentially of from 25% to 75% by weight of powered asphalt having a penetration of less than about 5 at 77° F. substantially all of which will pass a 40 mesh sieve, and from 25% to 75% by weight of finely-divided barium sulfate substantially all of which passes a 325 mesh sieve.

2. A pulverulent storage-stable asphaltic composition composed essentially of substantially equal parts by weight of powered asphalt having a penetration of less than about 5 at 77° F. substantially all of which will pass a 40 mesh sieve and finely-divided barium sulfate substantially all of which passes a 325 mesh sieve, and an anti-stripping agent.

3. A pulverulent storage-stable asphaltic composition composed essentially of from 25% to 75% by weight of powered asphalt substantially all of which will pass a 40 mesh sieve having a softening point of from about 200° F. to about 300° F. and a penetration of less than about 5 at 77° F., and from 25% to 75% by weight of finely-divided barium sulfate substantially all of which passes a 325 mesh sieve.

HAROLD B. PULLAR.

REFERENCES CITED

The following references are of record in the file of this patent:

UNITED STATES PATENTS

| Number | Name | Date |
|---|---|---|
| 1,670,844 | Cone | May 22, 1928 |
| 1,685,304 | West | Sept. 25, 1928 |
| 2,078,727 | Jackson | Apr. 27, 1937 |
| 2,191,295 | Dohse et al. | Feb. 20, 1940 |
| 2,349,445 | McGrane | May 23, 1944 |